US 8,180,778 B1

(12) United States Patent
Pedersen et al.

(10) Patent No.: US 8,180,778 B1
(45) Date of Patent: May 15, 2012

(54) GENERATING ACTION TRAILS FROM WEB HISTORY

(75) Inventors: Elin Pedersen, Portola Valley, CA (US); Karl A. Gyllstrom, Chapel Hill, NC (US); Shengyin Gu, Sunnyvale, CA (US); Peter Jin Hong, San Francisco, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 12/701,444

(22) Filed: Feb. 5, 2010

(51) Int. Cl.
 *G06F 17/30* (2006.01)
(52) U.S. Cl. ....................................... 707/739
(58) Field of Classification Search .................. 707/738, 707/739
 See application file for complete search history.

(56) References Cited

U.S. PATENT DOCUMENTS

| | | | |
|---|---|---|---|
| 5,778,363 A * | 7/1998 | Light | 1/1 |
| 6,370,551 B1 * | 4/2002 | Golovchinsky et al. | 715/234 |
| 6,772,170 B2 * | 8/2004 | Pennock et al. | 1/1 |
| 6,829,613 B1 * | 12/2004 | Liddy | 707/694 |
| 7,331,517 B2 * | 2/2008 | Inakoshi et al. | 235/380 |
| 7,496,567 B1 * | 2/2009 | Steichen | 1/1 |
| 7,577,652 B1 * | 8/2009 | Rajan et al. | 1/1 |
| 7,765,176 B2 * | 7/2010 | Simmons et al. | 706/45 |

* cited by examiner

*Primary Examiner* — James Trujillo
*Assistant Examiner* — Jorge A Casanova
(74) *Attorney, Agent, or Firm* — Fish & Richardson P.C.

(57) ABSTRACT

Methods, systems, and apparatus, including computer programs encoded on a computer storage medium, for generating action trails from web history are described. In one aspect, a method includes receiving a web content access history of a user, the content access history including one or more user actions, each user action being associated with a content item upon which the user action is performed and identifying one or more action trails from the content access history, each action trail including a sequence of user actions performed one content items relating to a topic. Identifying a particular action trail includes clustering the user actions into a series of segments using temporal criteria; calculating semantic similarities between the content items, and adding a segment of the series of segments to the action trail when the semantic similarities between the segment and another segment satisfy a similarity threshold.

32 Claims, 8 Drawing Sheets

GENERATING ACTION TRAILS FROM WEB HISTORY

BACKGROUND

This specification relates to organizing activity histories.

The World Wide Web (the web) is large and complex. In a process of navigating the web, a user often loses track of what he or she has visited. For example, a typical web user often wishes to revisit a previously viewed webpage, but cannot remember what the previously viewed webpage was or how to get to the page. It is therefore difficult for the user to find the page again.

Several conventional technologies allow users to find webpages that are previously visited. For example, bookmarks are a simple tool for keeping references to visited pages. However, inserting a bookmark for a webpage requires the user to recognize the value of a page currently being viewed and to perform an action adding the bookmark to the page.

Additionally, typical web browsers can retain the user's browser history. In addition to client-based histories, the user can also use server-based services (e.g., Google Web History). Browsing histories enable the user to search for entries in his web history using text queries, akin to web searches. Typically, browsing histories simply provide a list of user actions in the order they occurred. Existing browsing histories have no intuitive abstractions built upon them. Finding information within browsing histories grows more difficult with size. Users often elect to re-find information by issuing new web queries rather than search the users' browsing histories.

SUMMARY

In general, one aspect of the subject matter described in this specification can be embodied in a method that includes receiving a content access history of a user, the content access history including one or more user actions, each user action being associated with a content item upon which the user action is performed; identifying one or more action trails from the content access history, each action trail including a sequence of user actions corresponding to content items relating to a topic, where identifying a particular action trail includes clustering the user actions into a series of segments using one or more temporal criteria; calculating semantic similarities between the content items, where the semantic similarities change as a function of the series of segments; adding a segment of the series of segments to the action trail, when the semantic similarities between content items corresponding to the user actions in the segment and content items corresponding to the user actions in another segment satisfy a similarity threshold; and providing the action trails for display on a display device.

These and other embodiments can optionally include one or more of the following features. Clustering the user actions into the series of segments using the temporal criteria can include identifying segmentation boundaries in the content access history, each segmentation boundary determined by an elapsed time period between two consecutive user actions, a length of the elapsed time period satisfying a boundary threshold; and clustering the user actions into the series of segments according to the segmentation boundaries.

Calculating the semantic similarities between the content items can include calculating cosine similarities between topic vectors of the content items, the topic vectors of the content items each including a list of topics, each topic including a semantic descriptor of one or more of the content items. Calculating semantic similarities between the content items can include calculating semantic similarities between segments, including calculating cosine similarities between the topic vectors of the respective segments, where the topic vector of each of the segments is calculated using an average of topic vectors of content items associated with user actions clustered into the segment.

Calculating semantic similarities between the content items can include calculating a topical coherence of each of the segments, the topical coherence measuring semantic similarities between content items associated with user actions clustered into the segment. Calculating the topical coherence of a particular segment can include calculating an average coherence of the segment, including averaging semantic similarities of pairs of the content items associated with the user actions clustered into the segment. Calculating the topical coherence of the segment can include, for each first content item, determining a semantic similarity between the first content item and each second content item, the first content item and second content item associated with the user actions clustered into the segment; for each first content item, determining a maximum semantic similarity between the first content item and the second content items; calculating an average value of the maximum semantic similarities of the first content items; and designating the average value as the maximum coherence of the segment. Calculating the topical coherence of the segment can include designating an absolute difference between the average coherence and the maximum coherence as the topical coherence of the segment. Identifying the one or more action trails can include determining that the topical coherence of the segment satisfies a threshold coherence value; splitting the segment into one or more virtual sub-segments from the segment upon the determining; and identifying an action trail from each of the virtual sub-segments.

Adding the segment of the series of segments to the action trail can include: if the action trail is empty, adding the segment to the trail; and if the action trail is not empty, determining a threshold similarity value; and adding the segment to the action trail if a semantic similarity between the segment and one of the last threshold number of segments in the action trail satisfies a threshold similarity value. Adding the segment of the series of segments to the action trail can further include determining the threshold number of segments.

The method can further include designating the action trail as a research trail. Designating the action trail as the research trail can include identifying a number of segments in the action trail; identifying an accumulated duration of the action trail, including calculating a duration of each user action; and accumulating the durations of user actions in the action trail; and designating the action trail as the research trail when the number of segments in the action trail satisfies a segment threshold and the accumulated duration satisfies a duration threshold. Providing the action trails for display can include providing the action trail for display when the action trails are research trails.

The method can further include designating the action trail as an early research trail. Designating the action trail as an early research trail can include identifying a minimum topical similarity between segments in the action trail; and designating the action trail as the early research trail if the minimum topical similarity satisfies a threshold. Providing the action trails for display can include providing the action trail for display when the action trails are early research trails.

Particular embodiments of the subject matter described in this specification can be implemented to realize one or more of the following advantages. The techniques described in this specification allow a user to browse through the user's previous web view sessions in an organized and focused manner without having to organize the previous sessions manually. In web-based research and investigations, the user often asks in what context the user was performing the research, for instance, "Where is all the stuff I just worked on?" or "Where was I?" The techniques described in this specification can help establish and maintain the context in a way akin to what the user perceives as tasks, such that the user can quickly go back to where the user stopped.

Techniques for generating action trails can identify multiple action trails when the user is multi-tasking, distinguish between different tasks when the user is multi-tasking, thereby helping the user to identify his or her research focus. In a short period (e.g., a few minutes), the user can intermittently browse the web on multiple topics. The techniques described in this specification can help the user to identify the multiple topics, including grouping the user's activities on each topic in temporally ordered lists. This enables the user to continue his research on a particular topic.

Techniques for generating action trails can clarify a user's focus and avoid wasting time. The action trails can be provided to the user as a reflection of webpages where the user has spent significant effort over time. Each action trail, even if not semantically rigid, can assist the user to remember the user's past activities by reminding the user of what the user has seen or done before.

A user involved in early research typically works with a vague or very open question and only gradually builds sufficient understanding of a particular topic of interest. The user may be tempted to apply normal organization techniques (e.g., putting into folder, devising labeling schemes, etc.). However, the user can quickly realize that his effort is wasted and sometimes even counter-productive if his organizational scheme reflects an outdated understanding. The techniques described in this specification can organize the user's actions as the user's research progresses, so that the user need not to devise a new scheme (e.g., a new folder structure) even if the user's research topic changes according to the user's new understanding in the domain.

The action trails can be "harvested." Tasks that recur in multiple action trails can be used as templates. For example, the action trails can be used by teachers for educational purposes. The teachers can observe in the background when students do homework, and use the action trails as guided tracks in a research process.

Multiple action trails and segments can model multiple scenarios that allow a user to rebuild and remember his or her insights. In addition, the trails can be an assistive tool that can show how the user's insights can be combined in different ways to lead to new learning. Permutations of action trails have the potential to lead the user to multiple new insights, depending on how the user interprets the permutations.

The action trails can also be used as predictive instruments. For example, the trails can be utilized to suggest when a user may be losing his way. If the user's previous action trail fits a known kind of research, a server can help the user by suggesting next steps from other people's more successful research.

The action trails can be used as a recommendation system to be used in conjunction with a search engine. The action trails can be used as query refinements, pointing to trails that are similar to a current user query.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

To illustrate the techniques, a scenario where a user performs web research is described. The user can initiate research on object-oriented programming, and in the process, stumble on architecture, for example, because a programming resource found on-line heavily quotes a resource on architecture (see E. Gamma et al., DESIGN PATTERNS: ELEMENTS OF REUSABLE OBJECT-ORIENTED SOFTWARE, Addison Wesley Longman, 1995). From research on architecture, the user moves on to gardening and politics, because the architecture resource discusses gardens as well as benefits of small governments (see C. Alexander et al., A PATTERN LANGUAGE, TOWNS, BUILDINGS, CONSTRUCTION, Oxford Univ. Press, 1977). Over a period of time, the user intermittently browses the web on three topics (object-oriented programming, gardening, and politics). The techniques described in this specification can help the user to identify the three topics, and group the user's activities relating to each topic in temporally ordered lists, thus enabling the user to continue his research on any particular topic from where they left off.

Figure 1:
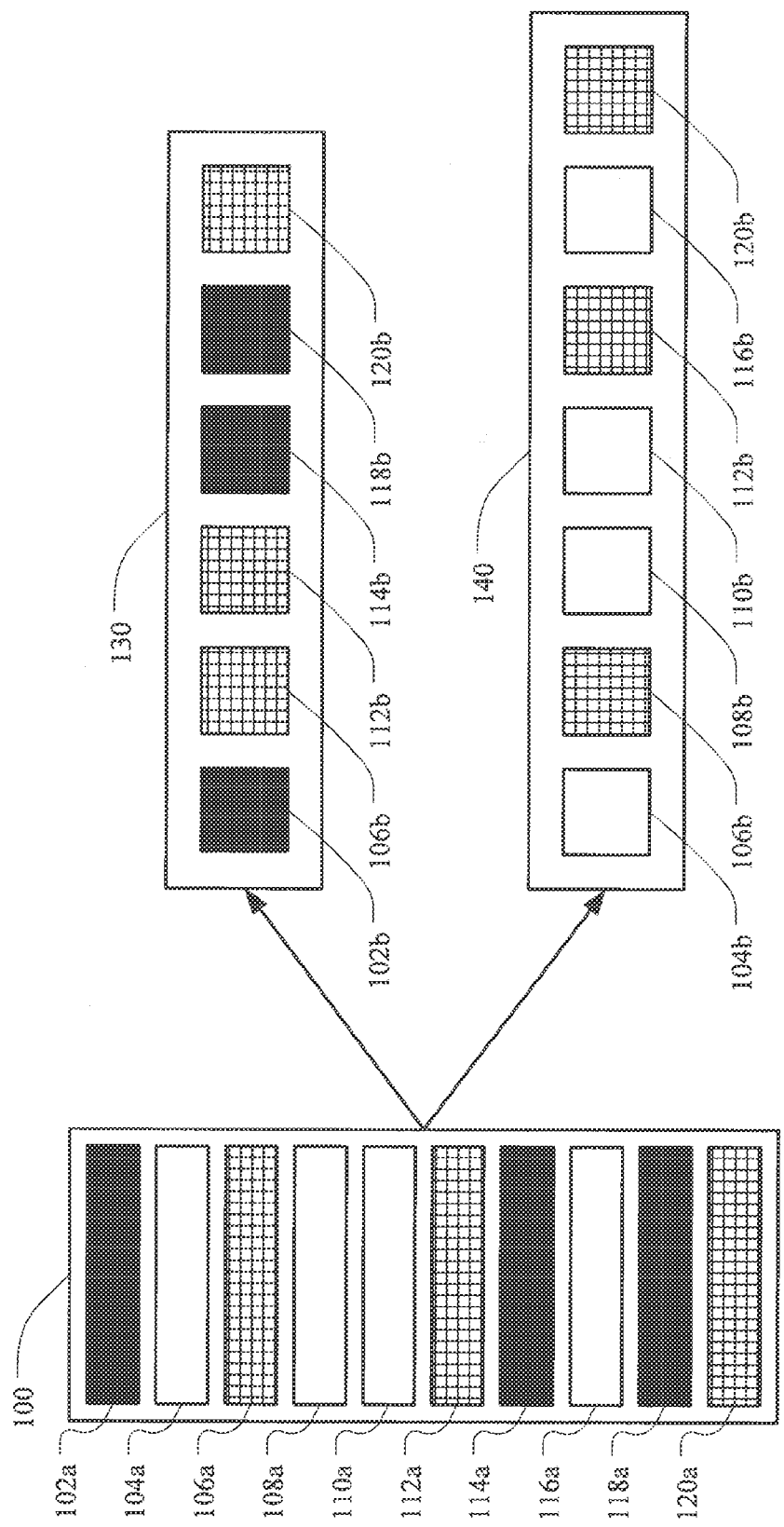
FIG. 1 is a diagram that provides an overview of example techniques of generating action trails from a web history.

FIG. 1 is a diagram that provides an overview of example techniques of generating action trails from a web history 100. For convenience, the techniques are described in reference to a system that implements the techniques.

Web history 100 is an example history of user activities 102a, 104a, 106a, 108a, 110a, 112a, 114a, 116a, 118a, and 120a performed sequentially in a time period. In particular, the user activities 102a-120a are user actions associated with various content items (e.g., webpages, images, or other resources) on the web. The user activities 102a-120a can be tracked on a client device (e.g., stored as history logs by a browser of a computer used by the user), or on a server device (e.g., stored as a search history on one or more servers that process the user's web access requests).

In the time period in which activities 102a-120a are performed, activities 102a, 114a, and 118a (represented as black boxes in FIG. 1) can generally relate to a first topic. Activities 104a, 108a, 110a, and 116a (represented as white boxes in FIG. 1) can generally relate to a second topic. Activities 106a, 112a, and 120a (represented as checkered boxes in FIG. 1) can generally relate to a "grey area," which can belong to both the first topic and the second topic.

User activities 102a-120a can represent part of an early stage of web research performed by the user. In some implementations, the web research begins from a submission of a general question (e.g., "what is a good book on object-oriented programming?"), or no question at all (e.g., the user reads a news article on a website, gets interested, and starts to following embedded hyperlinks in the news article). An early stage of web research is a stage where the user is not completely clear as to what the focus of the research might be. In general, a web research, especially early stage web research, can have the following characteristics: personal nature, fragmentation, sliding topic, and premature structure.

Research activity that is personal in nature refers to research that is done for a user's own consumption. For example, early research is performed to get an answer or understand an issue. The research is finished as soon as the answer is found or the user abandons the task for more important or more enjoyable pursuits. Material is collected but is minimally processed or organized.

User research activity can also be fragmented. Substantial work effort may go into a task but the task is done in small installments, possibly spread over long time with many other activities interspersed. The activities can be performed in an ad hoc manner, without obvious focus or organization. Fragmentation can lead to time wasted in finding where to pick up from a previous round of research. Research on the first topic (e.g., activity 102a) can be performed first, interrupted by research on the second topic (e.g., activities 104a, 108a, and 110a) and "grey area" topics, and picked up again as activity 114a.

For example, the user performing some research on object-oriented programming reads about the programming book *Design Patterns*, sees a reference to the architecture book *A Pattern Language*, and proceeds to design a home garden following the architecture book, and forgets where he was in the programming research. In order to resume research on object-oriented programming, the user will need to find where he was with respect to object-oriented programming before the research moved to architecture.

User research activity can slide from one topic to another. Early research can include substantial user effort invested in a single thematic exploration, though the theme can change slightly during the research process as the user learns more about the research area in which she is interested. It is often difficult for the system to identify a specific task or a particular research area from a given user activity, even when the user can describe the task in person right there in the moment. Thus, while researching on one topic, the user can gradually change focus, or slide, to another topic. In the example given above, the user starts from design patterns in programming, moves to design patterns in architecture, and then to gardening.

Action trails 130 and 140 are generated from the web history 100. Action trails 130 and 140 are sequences of user activities, or activity trails, that are grouped together based on semantic and temporal criteria (e.g., when the user activities related to each other semantically and temporally). In some implementations, action trails are one-dimensional strings of temporally ordered events, starting from the most recent and going back in time. In some implementations, an event is a recorded user action (e.g., a page view) on a particular content item (e.g., a webpage). In some implementations, an event is an entry in the web history. The event includes a visited webpage or reference to a visited webpage. The event also includes implicit user activity information (e.g., time, predecessor, tabs, etc.). Action trails can be generated, for example, to reduce an amount of time that users may waste, and to aid users create and reestablish context across fragmented research activity without requiring the users to explicitly structure and organize the material.

Action trail 130 includes events 102b, 114b, 118b, which include user actions performed on content items that are related to the first topic (e.g., webpages on object-oriented programming). Action trail 130 also includes events 106b, 112b, and 120b. Events 106b, 112b, and 120b include user actions performed on content items somewhat related to the first topic (e.g., webpages on design patterns). Action trail 140 includes events 104b, 108b, 110b, and 116b. Events 104b, 108b, 110b, and 116b include user actions performed on content items that are related to the second topic (e.g., web pages on architecture). Action trail 140 also includes events 106b, 112b, and 120b. Events 106b, 112b, and 120b include user actions performed on content items somewhat related to the second topic (e.g., webpages on design patterns).

The action trails 130 and 140 are generated to help a user maintain a context of the user's research in each topic (e.g., what are the first, second, and third webpages the user visited that are related to programming, and what are the first, second, and third webpages the user visited that are related to gardening). The context can help the user identify what was left unfinished or where the user has left off on each topic. The system can provide the action trails 130 and 140 to the user for display on a display device. The action trails 130 and 140 can show the user individual action trails for different topics identified from the user's web history. The individual action trails can allow a user to restart particular research for a given topic where they left off more easily. The action trails 130 and 140 can help answer questions that the user often asks: "what did I leave unfinished?" and "where did I leave off last time I worked on this?"

To provide the context to the user, the system can generate action trails 130 and 140 by anchoring a representation in a current location within an action trail for a given topic (e.g., as of "now," what the last-visited pages are and on what topic). The action trails 130 and 140 can show a sequence illustrating how the user got to the current situation. In some implementations, the action trails 130 and 140 are one-dimensional strings of temporally ordered event, starting from the most recent and going back in time.

The action trails 130 and 140 can be formatted, related to content items, and displayed on a display device. The display of the action trails 130 and 140 can include a sequence of content items or references to content items (e.g., uniform resource locators (URLs), thumbnail images, or mini-forms). The sequence can be ordered forward (oldest item first) or backward (oldest item last).

To generate action trails 130 and 140, the system extracts different types of information including user activity information (e.g., information about time and duration) and semantic information from available sources of user activity (e.g., web history 100). Each type of information, when taken alone, can potentially be limited, noisy, or error-prone. For instance, using semantic analysis to determine similarity between visited pages can be limited to those pages that lend themselves to semantic analysis (e.g., pages that are accessible and contain a large amount of text).

However, a particular combination of temporal information and semantic information allows mitigation of weakness in each technique taken individually. For instance, the system can use temporal proximity of user activities (e.g., activities 108a and 110a) to compensate for lack of semantic specificity of webpages (e.g., when activity 110a is a visit of a webpage that contains only an image and no text). The system can tentatively assume that content items visited in two user activities that are temporally proximate to each other to be related to each other, and to the user's current research.

Action trails 130 and 140 can accommodate ambiguities in a user's research. The action trails 130 and 140 can accommodate ambiguities in at least two areas. First, while each action trail provides information about a set of coherent and strongly related work (e.g., object-oriented programming), the system can allow topic sliding (e.g., topics in an action trail can shift over time). Thus, the content of the first and the last portion of the trail can potentially be quite different, reflecting the development of insight the user went through. For example, the first portion of the trail can relate to programming, and the last portion can relate to particular garden plants.

Second, relatedness can be perceived at many different levels. Relatedness between events (e.g., between events 112a and 110a, and between events 112a and 114a) can be determined not only based on the theme or topic of the work as exhibited in the content items acted upon, but also based the temporal proximity of events. For example, the action trails allows a user to track her activities such that she can find "the work I was doing when I got the email from my sister about sitting in the Paris café" based on temporal proximity of the work and the action of reading the email.

Figure 2:
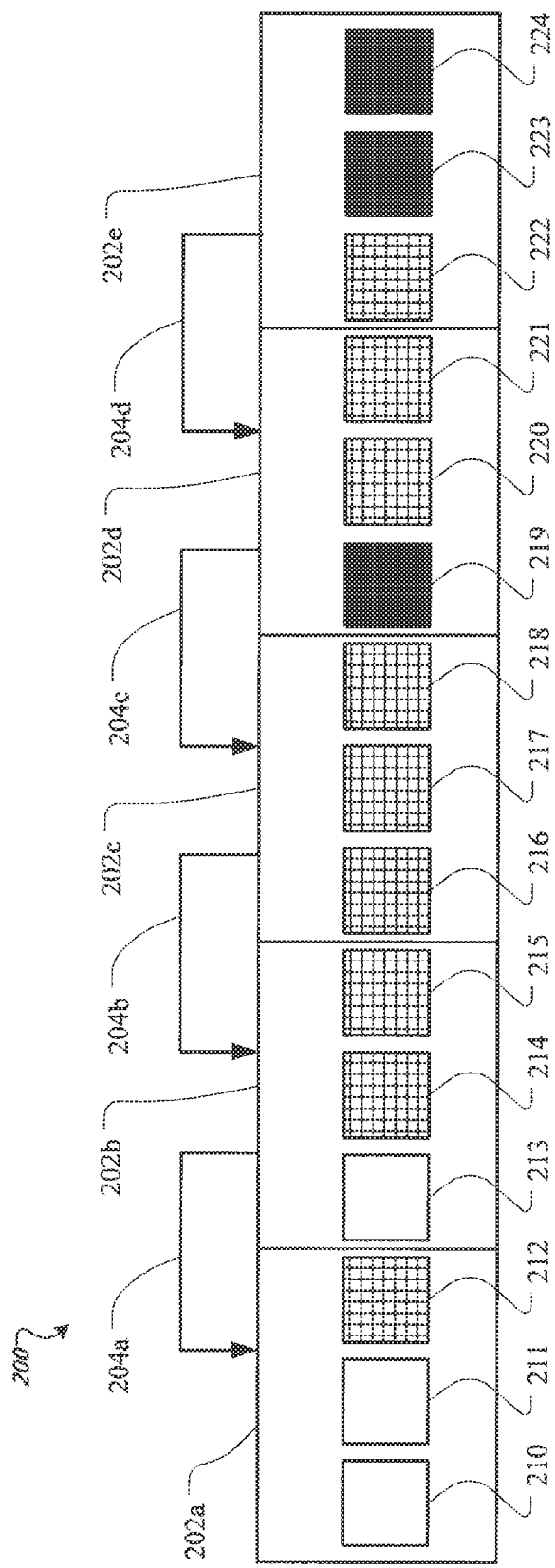
FIG. 2 is a diagram illustrating example techniques of generating an action trail using temporal and semantic information.

FIG. 2 is a diagram illustrating example techniques of generating an action trail based on temporal and semantic information. For convenience, the techniques are described in reference to a system that implements the techniques. Generating the action trail can include analyzing a web history according to both a temporal stage and a semantic stage (not necessarily in that order), which are described below.

Research session 200 includes a time-based series of events 210-224. Each event can be a user action on a content item (for example, the initiation of a search query or viewing of a web page). The events 210-224 are positioned in order of occurrence in time. In the temporal stage of generating the action trail, the system can generate activity-based segmentation of events 210-224. In some scenarios, one or more of the 210-224 can relate to content items are unsuitable for semantic analysis but are temporally related to other events in the research session 200. Some examples of these content items are webpages containing mostly audio information (e.g., music) or visual information (e.g., movies or images) but very little or no textual material in which to base a semantic analysis. In some other cases, the content items can be webpages that cannot be retrieved for semantic analysis (e.g., webpages that are protected or have expired).

Events that relate to content items that are unsuitable for semantic analysis can be related to their temporal neighbors based on user activity. For example, the user can view a text-rich webpage in event 216, view an image in event 217 (e.g., by clicking a link of the webpage of event 216), and click on another link to a second text-rich webpage in event 218. Thus, the system can relate events 216, 217, and 218 nonetheless, based on proximity in time between events 216, 217, and 218, despite the lack of semantic relations between event 217 and events 216 and 218.

Research session 200 includes temporal clusters of events. In a temporal clustering process, the system can organize the events into discrete periods, which are denoted as segments (e.g., segments 202a-e). A segment is a group of sequential events enclosed in temporal boundaries. A temporal boundary can be produced from a period of inactivity. In some implementations, when a period of more than N (e.g., N=5) minutes transpire between two user activities as recorded in a user activity history, a temporal boundary is generated. Events in a same segment are in temporal proximity of one another.

In the semantic stage of generating the action trail, the system performs semantic analysis of events 210-224 and segments 202a-e. Events 210-224 can include user actions on content items that contain substantial contents (e.g., text) that can be subject to semantic analysis for detecting relationship between the events. Semantic analysis is based on "topics" of the events 210-224 and segments 202a-e. A topic of an event is a semantic descriptor, a so-called topic vector, that describes the content item of the event.

The topic can be retrieved by various topic retrieval techniques. For example, the system can apply Latent Dirichlet Allocation topic-detecting algorithm to content items such as webpages. The Latent Dirichlet Allocation algorithm can generate a list of $\mu$-topics (a $\mu$-topic is a list of prominent words ordered according to their importance to the topic). For each webpage, the algorithm can generate a vector of real values between zero and one, reflecting the relative strength of semantic relationship between the page and the pt-topics.

Each event can be augmented with an event topic vector. The event topic vector is a topic vector of the event. A segment can be augmented with a segment topic vector in a similar manner as an event topic vector describing an individual event. The system can generate a segment topic vector for each segment. To generate a segment topic vector for a segment (e.g., segment 202a), the system can calculate an average of the event topic vectors of each event within the segment (e.g., events 210, 211, and 212 in segment 202a), and designate the average as the segment topic vector.

To generate a coherent action trail, the system adds semantically similar segments to the action trail. The system can measure how semantically similar the segment 202a-e are related to each other by measuring a topical similarity between the segments, which are represented by arrows 204a-d in FIG. 2. Topical similarity between two segments can be computed in various ways. In some implementations, topical similarity between two segments (e.g., segments 202a and 202b) is calculated using cosine similarity between the topic vectors of segments (e.g., the cosine similarity between the topic vectors of segments 202a and 202b).

Figure 3:
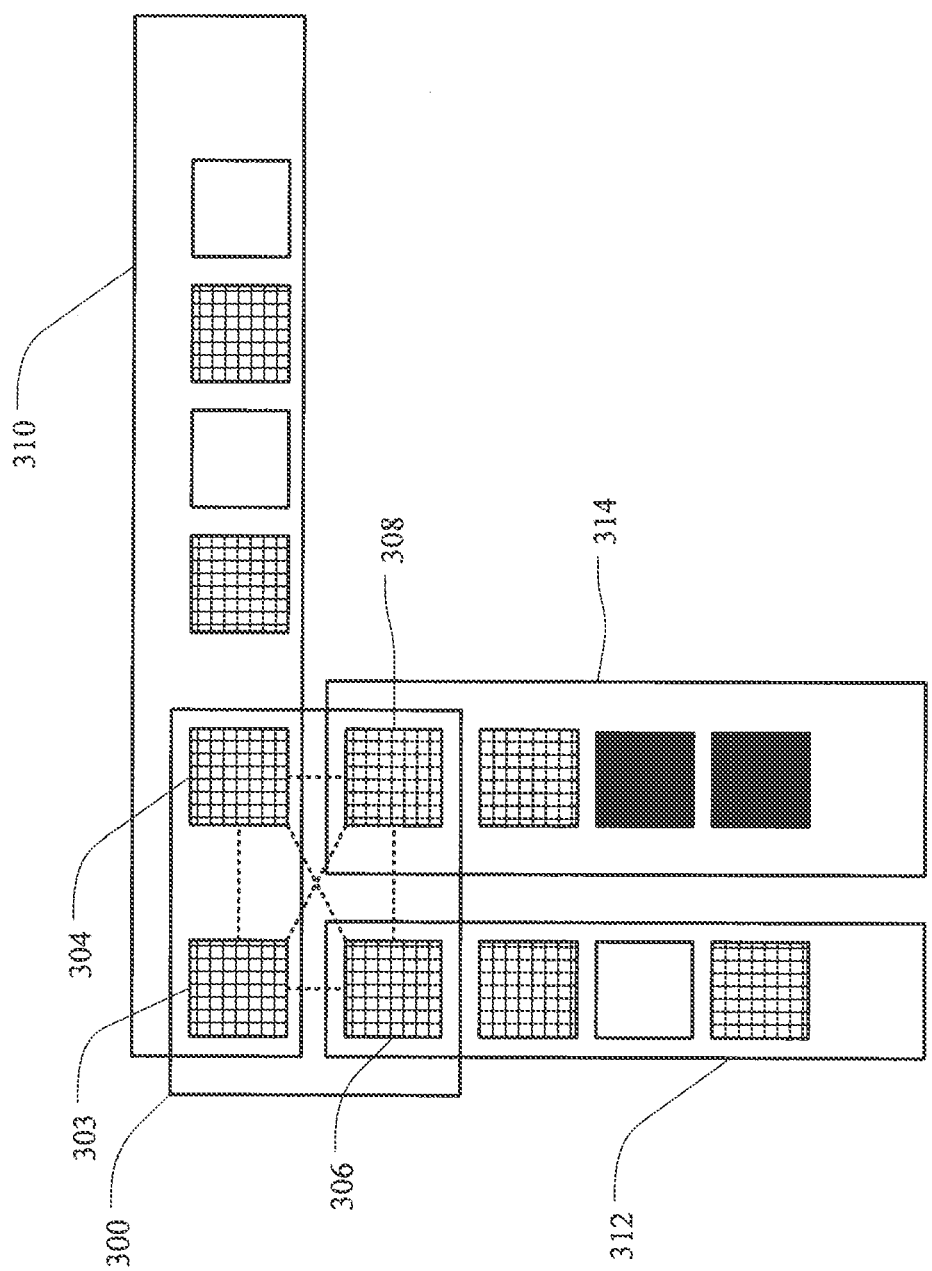
FIG. 3 is a diagram illustrating example techniques of generating multiple action trails from a multi-task research session.

FIG. 3 is a diagram illustrating techniques of identifying multiple action trails from a single, multi-task segment. For convenience, the techniques are described in reference to a system that implements the techniques.

Segment 300 can be one particular segment that is diffused (e.g., containing events relating to content items that are not particularly related to each other). A diffused segment can be a segment that has little or no focus. Diffused segment 300 exists when, for example, a user begins her research and is uncertain which research area to explore. As a result, the user visits a variety of webpages in a short time period. Although the system can provide segment topic vectors to all segments, including diffused segment 300, the diffused segment 300 can be less interesting for the overall goal of creating coherent action trails than a mono-focal segment. Therefore, the system can handle diffused segment 300 by virtually dividing it into multiple mono-focal sub-segments.

To measure whether segment 300 is diffused, the system calculates a coherence within segment 300. The coherence, also called a fragmentation value, can be a topical coherence, which measures an extent to which events within a segment (e.g., events 303, 304, 306, and 308 in segment 300) are semantically similar to one another. To calculate the topical coherence of a given segment, the system measures how semantically similar the events within the segment are related to each other using a topical similarity between each pair of events in the segment. Topical similarity between two events in a pair can be calculated in various ways. In some implementations, topical similarity between two events (e.g., events 303 and 304) is calculated using cosine similarity between the topic vectors of the content items of events 303 and 304.

The system calculates the coherence of segment 300, or segment coherence, by combining two qualities called average coherence (AC) and maximum coherence (MC), both based on the topical similarities between the events within segment 300. The average coherence can be calculated by averaging the topical similarity for all pairs of events within a segment. For example, the average coherence of segment 300 is calculated by averaging the topical similarities between the following event pairs, following the dotted lines of FIG. 3: (event 303, event 304); (event 303, event 306); (event 303, event 308); (event 304, event 306); (event 304, event 308); and (event 306, event 308).

To calculate maximum coherence, the system determines a maximum topical similarity that each event e in segment S shares with any other event in S. The system then calculates the average of each of these maximum values. For example, the similarity values between events 303, 304, 306, and 308 in segment 300 can have the following values:

| Event Pair | Topical Similarity |
|---|---|
| (event 303, event 304) | 0.2 |
| (event 303, event 306) | 0.6 |
| (event 303, event 308) | 0.3 |
| (event 304, event 306) | 0.4 |
| (event 304, event 308) | 0.3 |
| (event 306, event 308) | 0.4 |

The maximum topical similarities of events 303, 304, 306, and 308 are 0.6, 0.4, 0.6, and 0.4, respectively. The maximum coherence of segment 300, therefore, is 0.5.

The topical coherence of a segment (e.g., segment 300) is defined as the absolute difference between AC and MC. A large topical coherence value can signal a multi-tasking segment. High AC and MC can indicate a mono-focal segment, while low AC and MC can indicate a diffused segment.

A diffused segment (e.g., segment 300) can be potentially split into two or more virtual sub-segments to achieve better coherence within the virtual sub-segments. Each virtual sub-segment can have fewer focuses than the original diffused segment 300. The system can identify the virtual sub-segments, assign topic vectors to the virtual sub-segments, and calculate similarities using sub-segments when generating action trails.

In some implementations, the system uses a brute-force algorithm for virtually splitting diffused segments. The system can randomly divide a diffused segment (e.g., segment 300) into two substantially equal-sized sub-segments (e.g., a first sub-segment that includes events 303 and 304 and a second sub-segment that includes events 306 and 308). The size of each sub-segment can be measured by number of events in a sub-segment. When a segment being split includes an odd number of events, the two sub-segments can be substantially equal-sized if the difference in number of events in the two sub-segments equals one. For each event in a sub-segment, the system attempts to move the event over to the other sub-segment. The attempt is successful, if moving the event would result in an improvement of the average topical coherences for both sub-segments. The algorithm can terminate when all events in the segment are processed. In some implementations, the system iterates the algorithm by applying the algorithm to one or more sub-segments if the topical coherences of the sub-segments are not satisfactory (e.g., do not satisfy a specified coherence threshold).

For example, as shown in FIG. 3, diffused segment 300 is split into a first virtual sub-segment that includes events 303 and 304, and a second sub-segment that includes events 306 and 308. The topical coherence of the sub-segment that includes events 306 and 308 falls below a coherence threshold. Accordingly, the sub-segment is further split into a third sub-segment (which includes event 306) and a forth sub-segment (which includes event 308). The sub-segments can be designated as trailheads of multiple action trails 310, 312, and 314.

In some implementations, when a split occurs, all events 303, 304, 306, and 308 can belong to each of the action trails 310, 312, and 314. In some other implementations, events 306 and 308 are part of action trail 310. Event 306 can also be part of action trail 312. Event 308 can be part of action trail 314. The system can develop each of action trails 310, 312, and 314 in a separate direction.

Figure 4:
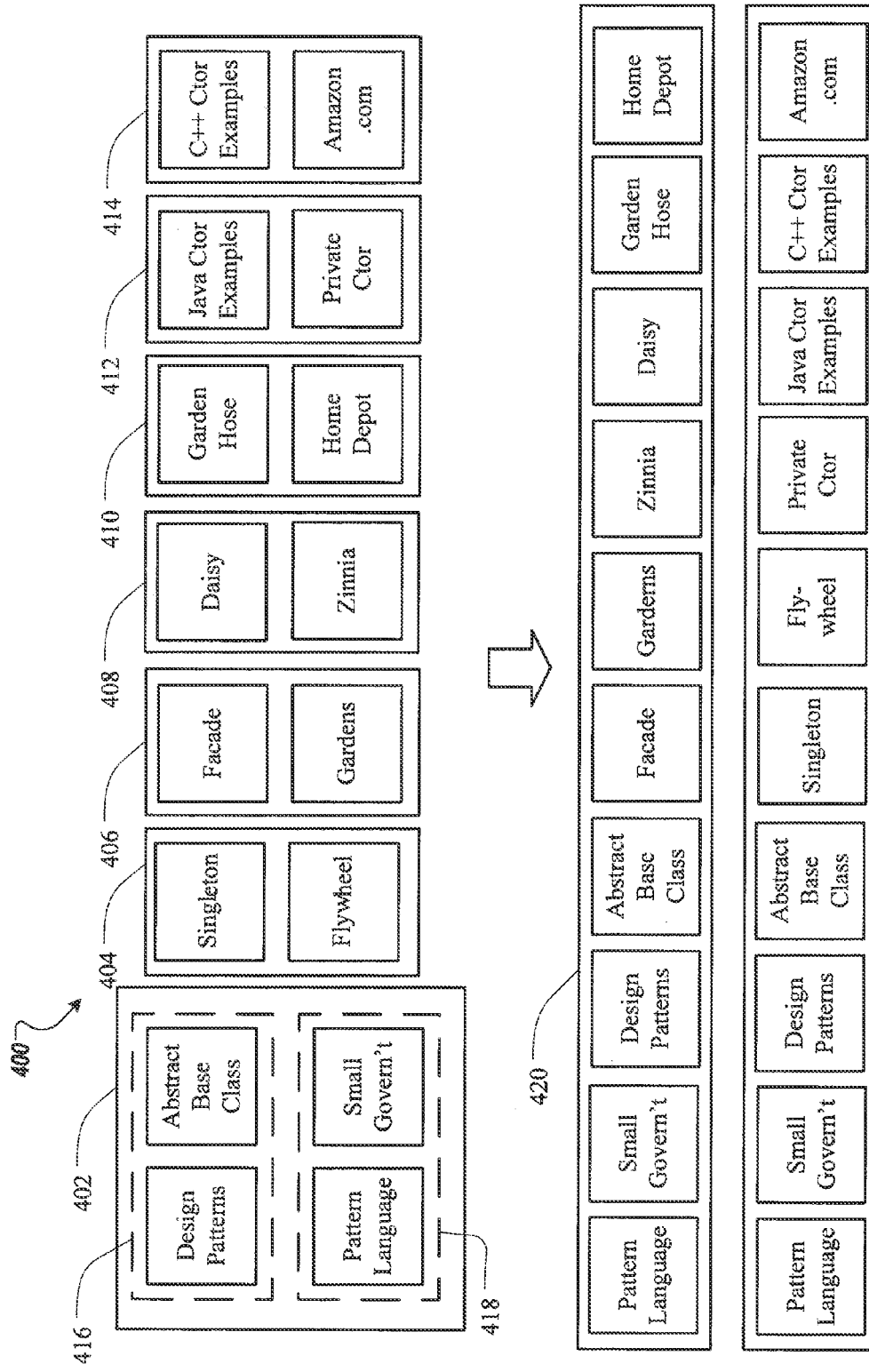
FIG. 4 is a diagram illustrating an example application of the techniques of creating two example action trails from web history.

FIG. 4 is a diagram illustrating an example application of the techniques of creating two example action trails from web history. An example architectural action trail and an example object-oriented programming action trail are developed from a temporal series of user actions. For convenience, the techniques are described in reference to a system that implements the techniques.

To generate the action trails, the system generates segments 402, 404, 406, 408, 410, 412, and 414 from an example web history 400 of a user. Segment 402 includes four example events, which correspond to particular user activities (e.g., page views, search queries, downloads, or other actions) performed on content items. In this example, the content items are webpages relating to "Design Patterns" (the programming book), "abstract base class," "Pattern Language" (the architecture book), and "small government."

In analyzing the four events, the system can decide that topical coherence of segment 402 falls below a coherence threshold. As a result, the system can virtually split segment 402 into two sub-segments (e.g., by designing a first sub-segment 416 that includes events associated with content items "Design Patterns" and "abstract base class" and a second sub-segment 418 that includes events associated with content items "Pattern Language" (the architecture book), and "small government"). Two action trails 420 and 422 can be generated from sub-segments 416 and 418, respectively.

In some implementations, all events in segment 402 can be included in each of the action trails 420 and 422, although events in the "other" sub-segment are excluded from subsequent calculations. For example, for action trail 420, sub-segment 416 is semantically similar to a next segment 404, whereas sub-segment 418 need not be semantically similar to segment 404.

Creating action trails 420 and 422 can include handling topic sliding. The system can tailor the trail creation to allow for topic sliding, including requiring strong semantic similarity between segments that are temporally close by (e.g., consecutive segments), but allowing weak semantic similarity between segments that are temporally far apart. The semantic similarity between two segments is strong if, for example, the two segments have a semantic similarity value that satisfies a similarity threshold.

Topic sliding allows an action trail to have little or no semantic similarity between the first and last segment, provided similarity remains strong within subsequences of the trail. For example, sub-segment 418 of events relating to "Pattern Language" and "small government" may be weakly similar to segment 408, which includes events related to "daisy" and "zinnia." However, sub-segment 418 can be similar to an intermediate segment 406, which includes events related to "façade" and "gardens," which are architectural concepts. Intermediate segment 406 thus can serve as a link between the sub-segment and segment 408, which allows the topic to "slide" from "small government" to "zinnia."

In general, action trails (e.g., action trails 420 and 422) are generated in the following way. Each segment or sub-segment S, if not already in a previous trail, can start a new trail. The system can add S to the new trail. For all segments after S up to a time limit, the system can check if a next segment N is to become part of the trail or begins a new trail. In some implementations, the system adds segment N to the trail, if:
1. N is not previously consumed (e.g., analyzed temporally and semantically and added to a trail); and
2. N is similar to the last W segments in the string, subject to a similarity threshold, where W is a configurable number that can be designated as a proximity threshold.

In some alternative implementations, the system adds segment N to the trail if:
1a. N is not previously consumed (e.g., analyzed temporally and semantically and added to a trail); and
2a. N is similar to any of the last W segments in the string, subject to a similarity threshold, where W is a configurable number that can be designated as a proximity threshold.

In case of virtual split of diffused segments (e.g., segment 402), the system calculates similarity against each sub-segment. In some implementations, if one of these similarities is above a certain similarity threshold, the entire segment 402 is included in the trail, but only the sub-segment will be considered in subsequent trail building. In this way, a diffused segment can belong to several trails. In other implementations, each sub-segment belongs to a distinct trail.

Figure 5:
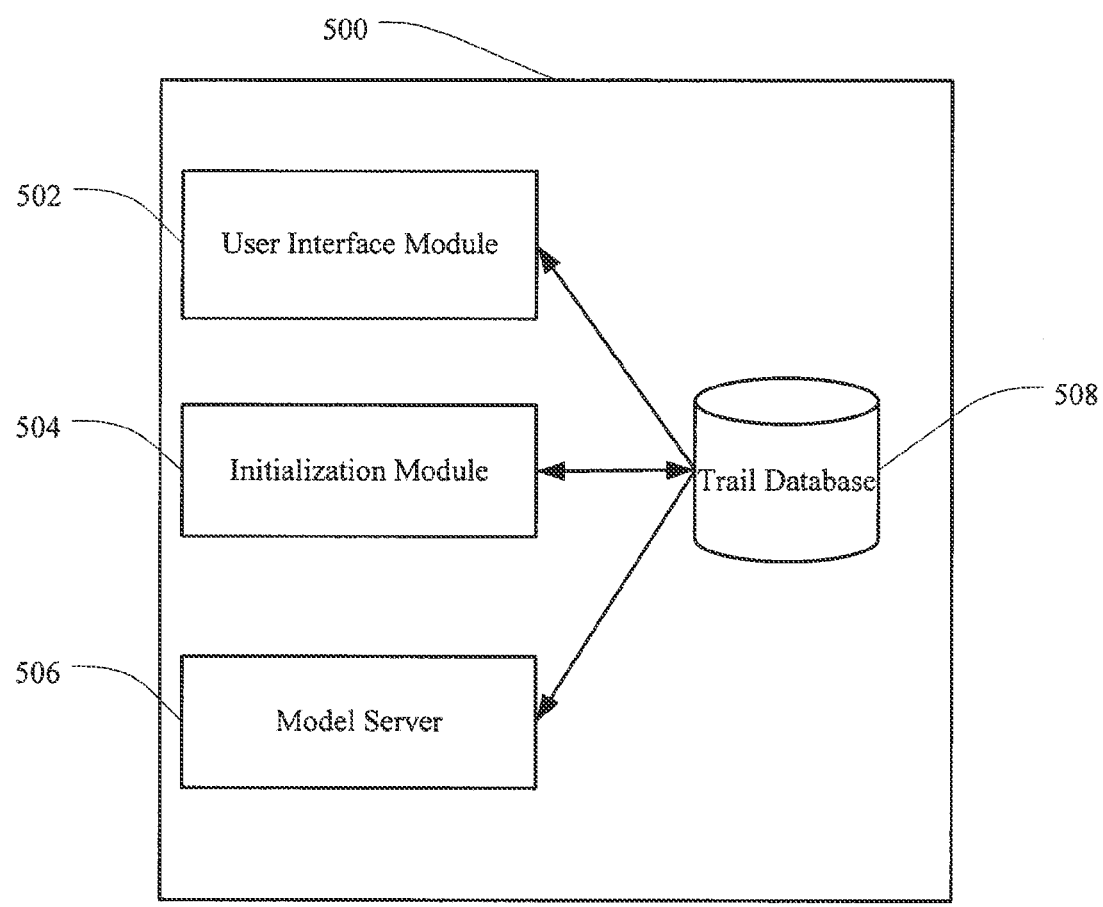
FIG. 5 is a block diagram illustrating components of an example system for generating action trails from web history.

FIG. 5 is a block diagram illustrating components of an example system 500 implementing techniques of generating action trails from a web history. System 500 can include four modules: user interface 502, initialization module 504, model server 506, which handles the background processing for the user interface, and a database 508.

User interface module 502 is used to provide action trails for display on a display device. For example, user interface module 502 can provide the action trails to a web browser on a client computer. User interface module 502 can be modeled after a "New Tab" page that exists in many browsers. A user can get to the "New Tab" page when he/she starts a browser or opens a new tab in the browser. In some implementations, user interface module 502 provides for display in the "New Tab" page one or more most recent action trails that the user worked on. User interface module 502 can provide for display other action trails upon request. The user can view, in the browser, the action trails, segments of the trails, as well as the events (visited pages or entered queries) in the trails.

In some implementations, user interface module 502 formats the action trails such that the action trails are visualized using screen snapshots, which can facilitate fast browsing. User interface module 502 can provide for display in the "New Tab" page input elements that can accept user inputs for manipulating the trails by various criteria, including time, duration, "recency," etc. While such features are essential to a fulfilling user experience, they are not crucial for demonstrating the action trail concept.

Initialization module 504 is used to capture users' activity history, detect linguistic topics, and translates temporal segmentation and topic clusters into action trails. Web histories stored on a server can be used, as well as web histories stored on client computers, if retrieved by the server. In various implementations, different history tracking mechanisms can result in different event sets. For instance, some history tracking mechanism can produce events of the following kinds: query, query-click, and page visit. Initialization module 504 can derive user activity data from time stamps attached to each of the user activities. More detailed user activity data can be derived from logs in browser clients. History data can be used to recreate the corresponding content item for semantic analysis. For example, a webpage can be retrieved based on a URL in the web history. In addition, content in the webpage can be extracted for subsequent processing by a topic detection algorithm.

Trail database 508 stores action trails. Trail database 508 can be any database (e.g., relational database, object-oriented database, or ad hoc file system) that stores action trails. In some implementations, the action trails produced by initialization module 504 are computed only once and stored in trail database 508. In other implementations, the action trails produced by initialization module 504 are calculated upon user request. The trail database 508 can be stored on a server side or client side. For example, a user can request an action trail from a server, and save the action trail.

When a user makes a request to see the trails, model server 506 receives the request and queries trail database 508. The server can send the trails received from database 508 in various formats (e.g., Extensible Markup Language (XML) format) to user interface module 502 for processing.

Figure 6A:
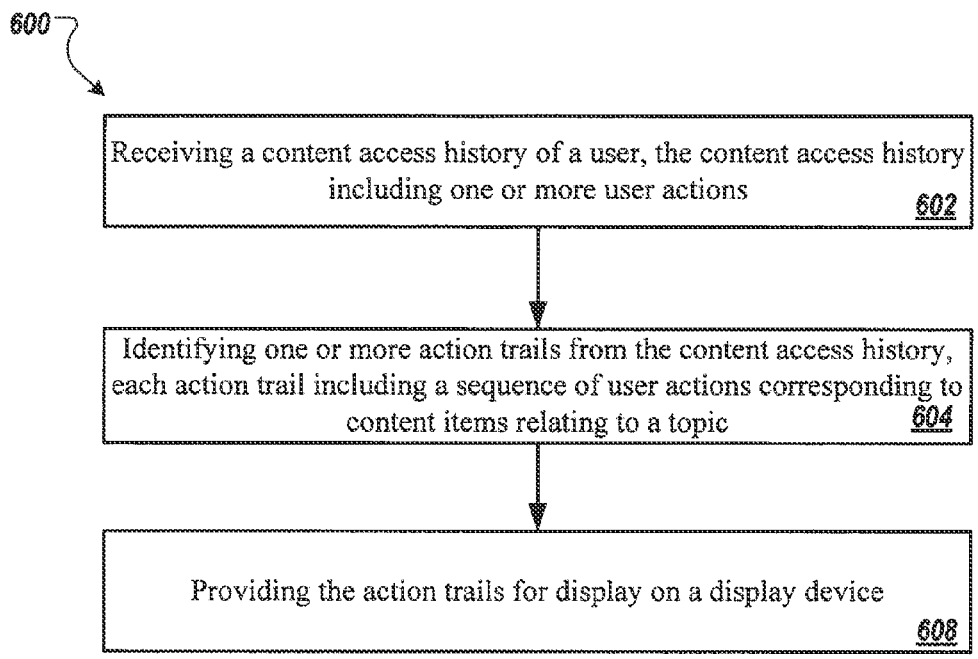
FIGS. 6A and 6B are flowcharts illustrating example processes of generating action trails from web history.
Figure 6B:
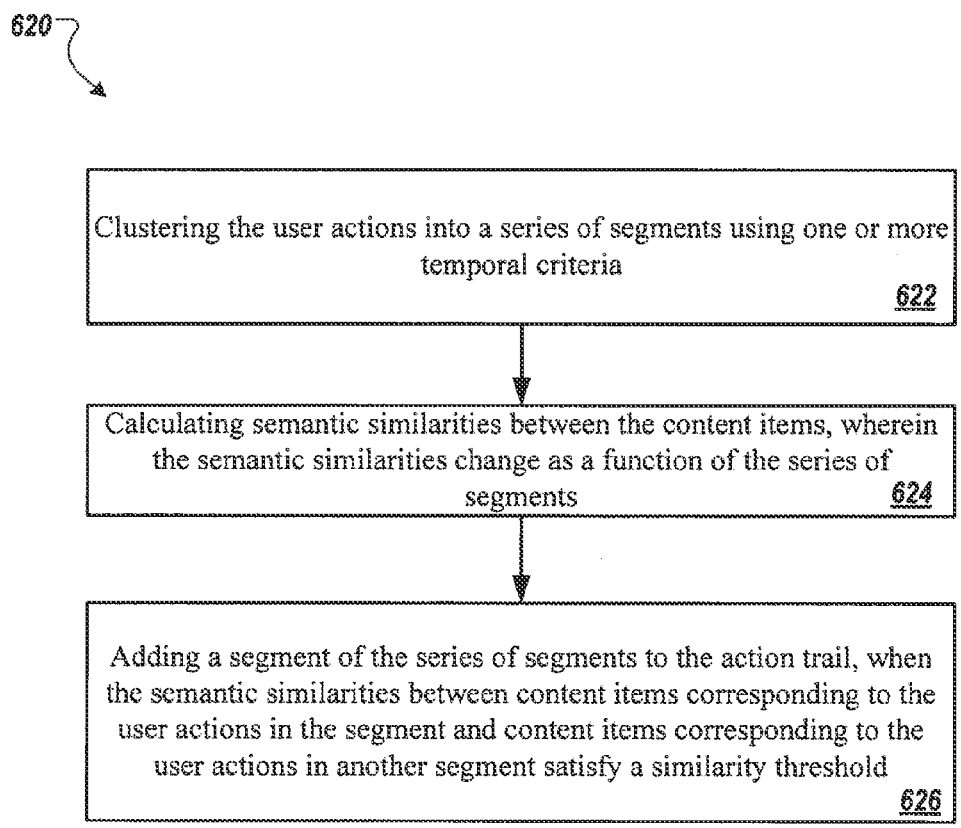

FIGS. 6A and 6B are flowcharts illustrating example processes of generating action trails from web history. For convenience, the processes are described in reference to a system that implements the processes.

FIG. 6A is a flowchart illustrating example process 600 of generating action trails from web history. The system receives (602) a web history of a user. The web history can include any content access history (e.g., a page view history, a search history, a file download history, or other forms of histories). The web history includes one or more user actions. Each user action is associated with a content item (e.g., a webpage, a file, an email, etc.) upon which the user action is performed. An action and an associated content item can form an event as described above.

The system identifies (604) one or more action trails from the web history. Each action trail includes a sequence of user actions associated with content items relating to a topic. The topic can be generated from the content items from a third-party process. The system provides (606) the action trails for display on a display device.

FIG. 6B is a flowchart illustrating an example process 620 of identifying an action trail from the web history. Multiple action trails can be identified from the user actions in the web history using the example process 620. The system clusters (622) the user actions into a series of segments using one or more temporal criteria. Clustering the user actions can include identifying segmentation boundaries in the web history. Each segmentation boundary can be determined by an elapsed time period between two consecutive user actions, when a length of the time period satisfies a predetermined boundary threshold. The user actions are thus clustered into the series of segments according to the segmentation boundaries.

The system calculates (624) semantic similarities between the content items. The semantic similarities change as a function of the series of segments. For example, a first segment and a second segment can be semantically similar in one aspect (e.g., based on a first match between the segment topic vectors of the first and second segments), where the second segment can be semantically similar to a third segment in another aspect (e.g., based on a second match between the segment topic vectors of the second and third segments). The change can reflect topic sliding. The series of segments can be ordered based on time. Calculating the semantic similarities between the content items can include calculating cosine similarities between topic vectors of the content items as described above with respect to FIG. 2. The topic vectors of the content items can include lists of topics. Each of the topics is a semantic descriptor of one or more of the content items.

In some implementations, calculating the semantic similarities between the content items includes calculating semantic similarities between segments. Calculating semantic similarities between segments can include calculating cosine similarities between topic vectors of the segments. A topic vector of each of the segments can be calculated using an average of topic vectors of content items associated with user actions clustered into the segment.

In some implementations, calculating the semantic similarities between the content items additionally includes calculating a topical coherence of each of the segments. The topical coherence can measure semantic similarities between content items associated with user actions clustered into the segment. Calculating the topical coherence of the segment can include calculating an average coherence of the segment. Calculating the average coherence of the segment, in turn, can include averaging semantic similarities of pairs of the content items associated with the user actions clustered into the segment. Further details on calculating the topical coherence of the segment are described below in reference to FIG. 7A.

When the semantic similarities between content items corresponding to the user actions in the segment and content items corresponding to the user actions in another segment satisfy a similarity threshold, the system adds (626) the segment to the action trail.

In some implementations, the system can designate the action trail as a research trail. An action trail can be designated as a research trail when the action trail has sufficient length and duration. The system can provide research trails for display on a display device, for example, when the system is sufficiently confident that a user is conducting research.

To designate the action trail as the research trail, the system identifies a total number of segments in the action trail. The system also identifies an accumulated duration of the action trail. In some implementations, identifying the accumulated duration of the action trail includes calculating a duration of each user action based on the web history and accumulating the durations of user actions in the action trail. In some implementations, identifying the accumulated duration of the action trail includes calculating a duration of each segment (thus excluding periods of inactivity) and calculating a sum of the durations of segments. The system designates the action trail as a research trail when the number of segments L in the action trail satisfies a segment threshold (e.g., L>=3) and the accumulated duration T satisfies a duration threshold (e.g., T>=60 minutes).

In some implementations, the system can designate the action trail as an early research trail. An action trail can be designated as an early research trail when the action trail has sufficient degree of topical fluctuation (e.g., when topical similarities between segments satisfy a threshold). The system can provide early research trails for display on a display device, for example, upon user request.

To designate the action trail as an early research trail, the system can identify a minimum topical similarity between segments (e.g., between the first and the last segment in the action trail). The system can designate the action trail as an early research trail if the inter trail similarity satisfies a threshold.

Figure 7A:
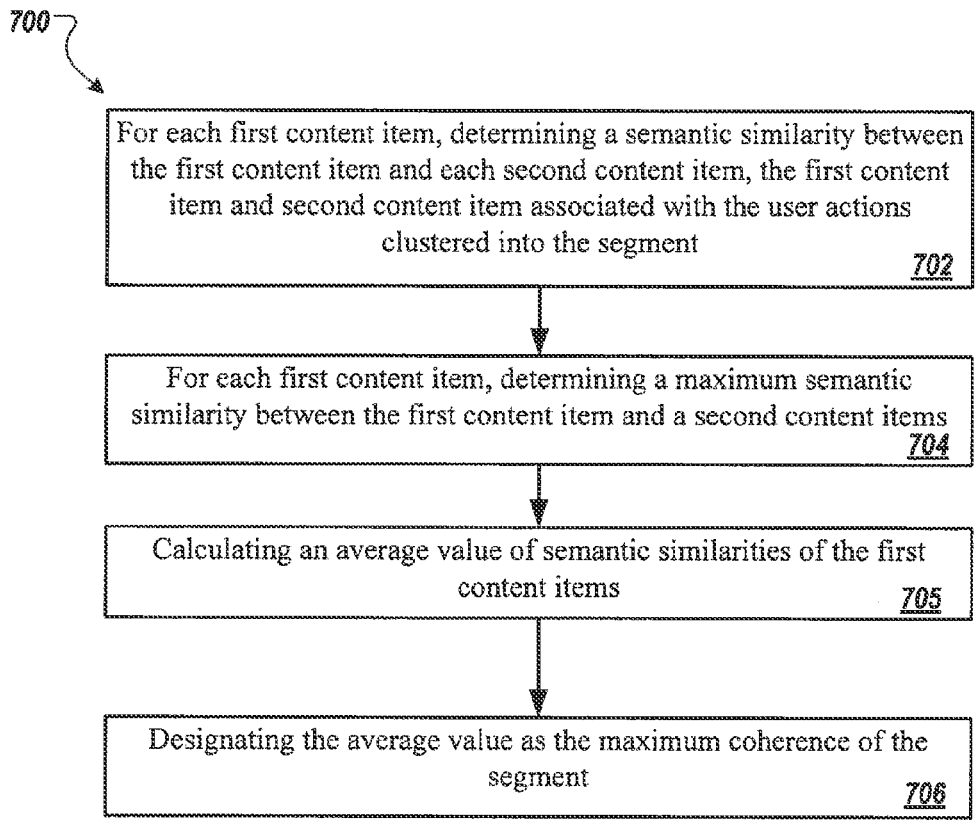
FIG. 7A is a flowchart illustrating an example process of calculating a topical coherence of a segment.

FIG. 7A is a flowchart illustrating an example process 700 of calculating a topical coherence of a segment. The topical coherence can include an average topical coherence, a maximum topical coherence, or both. For convenience, the process 700 is described in reference to a system that implements the process 700.

The segment can include user actions in association with content items. For each content item (first content item), the system determines (702) a semantic similarity between the content item and each other content item (second content item). The first content item and second content item can be associated with the user actions clustered into the segment.

For each first content item, the system determines (704) a maximum semantic similarity of the first content item to any other content item. This value is designated as a maximum semantic similarity.

The system calculates (705) an average value of the maximum semantic similarities of all content item. The system designates (706) the average as the maximum topical (or semantic) coherence of the segment. The average can be a weighted average based on time.

Figure 7B:
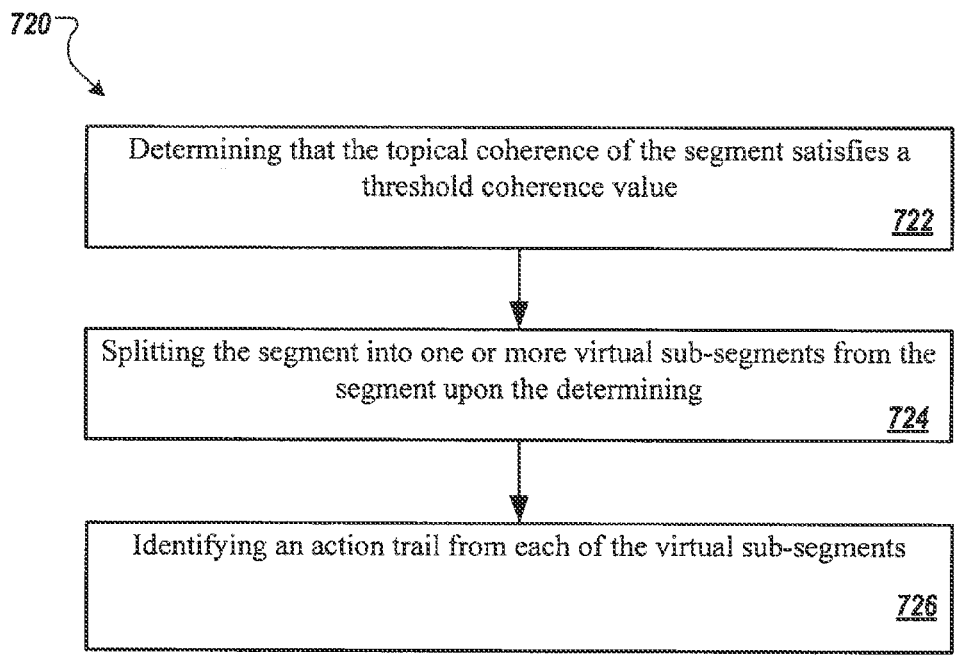
FIG. 7B is a flowchart illustrating an example process of splitting a segment.

FIG. 7B is a flowchart illustrating an example process 720 of splitting a segment. For convenience, the process 720 is described in reference to a system that implements the process 720. Splitting the segment can be a part of identifying the action trails.

The system determines (722) that the topical coherence of the segment satisfies a threshold coherence value. The system splits (724) the segment into one or more virtual sub-segments from the segment upon the determining. If the topical coherence of the segment fails to satisfy the threshold coherence value, the segment can be split. The system identifies (726) an action trail from each of the virtual sub-segments. In some implementations, the entire segment, including all the events in the segment, is added to the action trail. In some implementations, the system executes an iterative process and further divides a virtual sub-segment into finer-grained virtual sub-segments, and so on, until each virtual sub-segment has a topical coherence that satisfies the threshold coherence value.

Figure 8:
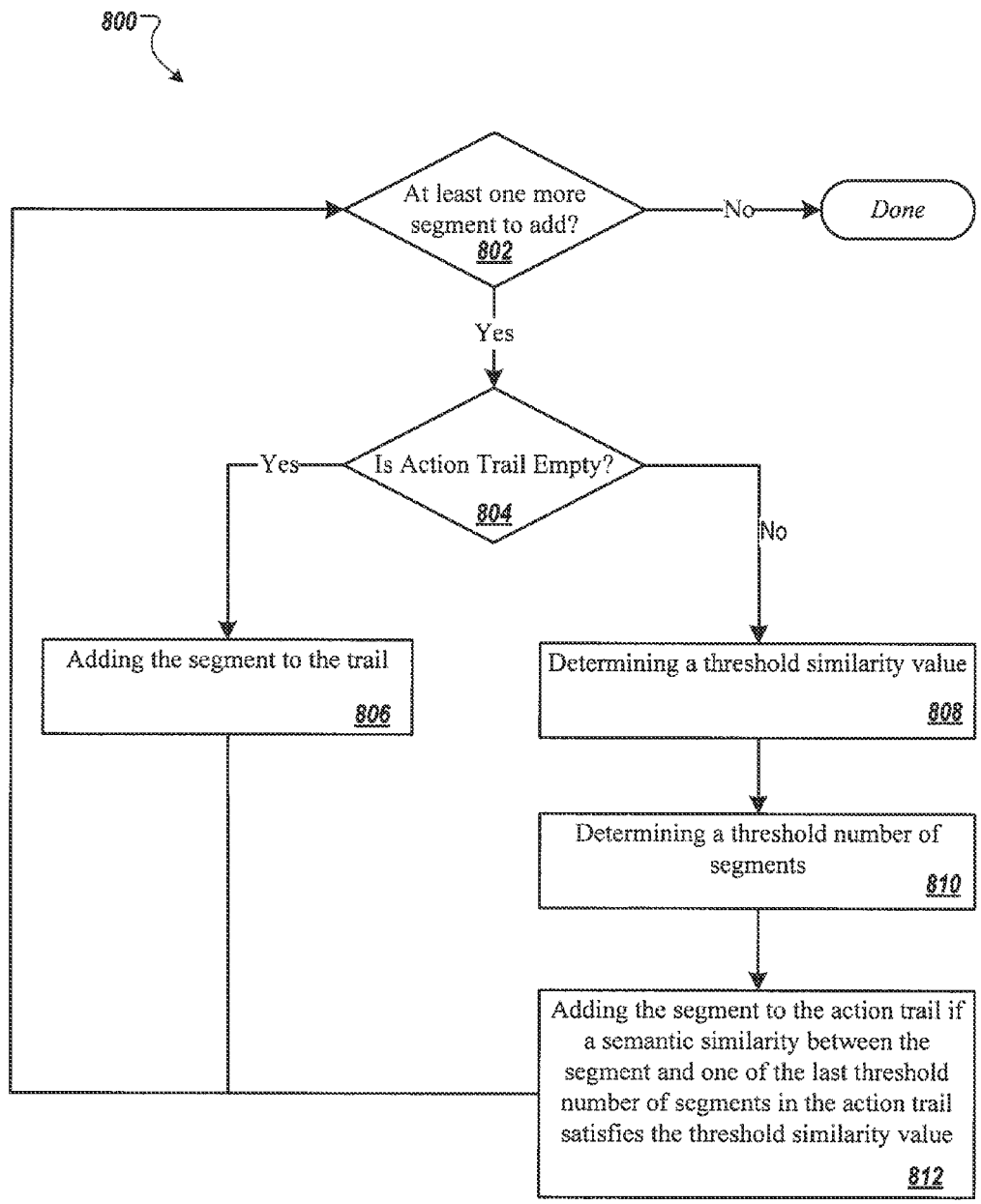
FIG. 8 is a flowchart illustrating an example process of generating an action trail.

FIG. 8 is a flowchart illustrating an example process 800 of generating an action trail. For convenience, the process 800 is described in reference to a system that implements the process 800.

The system can generate the action trail by adding to the trail segments, including the user actions and associated content items or references to the associated content items. The system determines (802) if there are more segments to be added to the trail. If there are no more segments in the web history, the trail is complete. The system can store the trail, for example, in a trail database. If the system determines that there is at least one more segment to be added to the trail, the system can examine the trail and determine (804) if the trail is empty.

If the trail is empty, the system adds (806) the segment to the trail. If the trail is not empty, the system determines (808)

a threshold similarity value. The segment can be added to the trail if the segment is semantically similar to at least part of the trail. If the segment is not semantically similar to any part of the trail, the system can mark the segment for future use (e.g., for generating a next trail). The system determines (810) a threshold number of segments. The segment can be added to the trail if the segment is semantically similar to at least the threshold number of segments. The system adds (812) the segment to the action trail if a semantic similarity between the segment and one of the last threshold number of segments in the action trail satisfies the threshold similarity value.

The system repeats process 800 for each segment until all segments in a web history are added to the action trail or marked. If there are marked segments (e.g., the segments not added to the trail), the system can repeat process 800 and generate another action trail, until all segments belong to one action trail or another.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a network routing device, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or a routing device, e.g., a network router, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs executing on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

An electronic document (which for brevity will simply be referred to as a document) can, but need not, correspond to a file. A document can be stored in a portion of a file that holds other documents, in a single file dedicated to the document in question, or in multiple coordinated files.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method executed by a computer, the method comprising:
    receiving a content access history of a user, the content access history including one or more user actions, each user action being associated with a content item upon which the user action is performed;
    identifying one or more action trails from the content access history, each action trail including a sequence of user actions corresponding to content items relating to a topic, wherein identifying a particular action trail includes:
        clustering the user actions into a series of segments using one or more temporal criteria;
        splitting a segment of the series of segments into multiple segments when a topical coherence value of the segment satisfies a threshold coherence value, wherein the topical coherence value of the segment measures a similarity between content items corresponding to user actions in the segment;
        calculating semantic similarities between the content items, wherein the semantic similarities change as a function of the series of segments; and
        adding one or more segments of the series of segments to the action trail, when the semantic similarities between content items corresponding to the user actions in the one or more segments and content items corresponding to the user actions in another segment satisfy a similarity threshold; and
    providing the action trails for display on a display device.

2. The method of claim 1, wherein clustering the user actions into the series of segments using the temporal criteria comprises:
    identifying segmentation boundaries in the content access history, each segmentation boundary determined by an elapsed time period between two consecutive user actions, a length of the elapsed time period satisfying a boundary threshold; and
    clustering the user actions into the series of segments according to the segmentation boundaries.

3. The method of claim 1, wherein calculating semantic similarities between the content items comprises calculating cosine similarities between topic vectors of the content items, the topic vectors of the content items each including a list of topics, each topic including a semantic descriptor of one or more of the content items.

4. The method of claim 3, where calculating semantic similarities between the content items comprises calculating semantic similarities between segments, including calculating cosine similarities between the topic vectors of the respective segments, where the topic vector of each of the segments is calculated using an average of topic vectors of content items associated with user actions clustered into the segment.

5. The method of claim 1, wherein calculating semantic similarities between the content items comprises calculating the semantic similarities between content items of different segments.

6. The method of claim 5, comprising calculating the topical coherence value of the segment, wherein calculating the topical coherence value of the segment comprises calculating an average coherence of the segment, including averaging semantic similarities of pairs of the content items associated with the user actions clustered into the segment.

7. The method of claim 6, wherein calculating the topical coherence value of the segment comprises:
for each first content item, determining a semantic similarity between the first content item and each second content item, the first content item and second content item associated with the user actions clustered into the segment;
for each first content item, determining a maximum semantic similarity between the first content item and the second content items;
calculating an average value of the maximum semantic similarities of the first content items; and
designating the average value as a maximum coherence of the segment.

8. The method of claim 7, wherein calculating the topical coherence value of the segment comprises designating an absolute difference between the average coherence and the maximum coherence as the topical coherence value of the segment.

9. The method of claim 1, wherein adding the segment of the series of segments to the action trail includes:
if the action trail is empty, adding the segment to the trail; and
if the action trail is not empty:
determining a threshold similarity value; and
adding the segment to the action trail if a semantic similarity between the segment and one of the last threshold number of segments in the action trail satisfies a threshold similarity value.

10. The method of claim 9, wherein adding the segment of the series of segments to the action trail further includes determining the threshold number of segments.

11. The method of claim 1, further comprising designating the action trail as a research trail.

12. The method of claim 11, wherein designating the action trail as the research trail includes:
identifying a number of segments in the action trail;
identifying an accumulated duration of the action trail, including:
calculating a duration of each user action; and
accumulating the durations of user actions in the action trail; and
designating the action trail as the research trail when the number of segments in the action trail satisfies a segment threshold and the accumulated duration satisfies a duration threshold.

13. The method of claim 12, wherein providing the action trails for display includes providing the action trail for display when the action trails are research trails.

14. The method of claim 11, wherein providing the action trails for display includes providing the action trail for display when the action trails are early research trails.

15. The method of claim 1, further comprising designating the action trail as an early research trail.

16. The method of claim 15, wherein designating the action trail as an early research trail includes:
identifying a minimum topical similarity between segments in the action trail; and
designating the action trail as the early research trail if the minimum topical similarity satisfies a threshold.

17. A system comprising:
one or more computers each including a processor and memory, the one or more computers configured to perform operations comprising:
receiving a content access history of a user, the content access history including one or more user actions, each user action being associated with a content item upon which the user action is performed;
identifying one or more action trails from the content access history, each action trail including a sequence of user actions corresponding to content items relating to a topic, wherein identifying a particular action trail includes:
clustering the user actions into a series of segments using one or more temporal criteria;
splitting a segment of the series of segments into multiple segments when a topical coherence value of the segment satisfies a threshold coherence value, wherein the topical coherence value of the segment measures a similarity between content items corresponding to user actions in the segment;
calculating semantic similarities between the content items, wherein the semantic similarities change as a function of the series of segments; and
adding one or more segment of the series of segments to the action trail, when the semantic similarities between content items corresponding to the user actions in the one or more segments and content items corresponding to the user actions in another segment satisfy a similarity threshold; and
providing the action trails for display on a display device.

18. The system of claim 17, wherein clustering the user actions into the series of segments using the temporal criteria comprises:
identifying segmentation boundaries in the content access history, each segmentation boundary determined by an elapsed time period between two consecutive user actions, a length of the elapsed time period satisfying a boundary threshold; and
clustering the user actions into the series of segments according to the segmentation boundaries.

19. The system of claim 17, wherein calculating semantic similarities between the content items comprises calculating cosine similarities between topic vectors of the content items, the topic vectors of the content items each including a list of topics, each topic including a semantic descriptor of one or more of the content items.

20. The system of claim 19, where calculating semantic similarities between the content items comprises calculating semantic similarities between segments, including calculating cosine similarities between the topic vectors of the respective segments, where the topic vector of each of the segments is calculated using an average of topic vectors of content items associated with user actions clustered into the segment.

21. The system of claim 17, wherein calculating semantic similarities between the content items comprises calculating the semantic similarities between content items of different segments.

22. The system of claim 21, the operations comprising calculating the topical coherence value of the segment, wherein calculating the topical coherence value of the segment comprises calculating an average coherence of the segment, including averaging semantic similarities of pairs of the content items associated with the user actions clustered into the segment.

23. The system of claim 22, wherein calculating the topical coherence value of the segment comprises:
- for each first content item, determining a semantic similarity between the first content item and each second content item, the first content item and second content item associated with the user actions clustered into the segment;
- for each first content item, determining a maximum semantic similarity between the first content item and the second content items;
- calculating an average value of the maximum semantic similarities of the first content items; and
- designating the average value as a maximum coherence of the segment.

24. The system of claim 23, wherein calculating the topical coherence value of the segment comprises designating an absolute difference between the average coherence and the maximum coherence as the topical coherence value of the segment.

25. A computer program product, encoded on a non-transitory computer-readable storage device, operable to cause data processing apparatus to perform operations comprising:
- receiving a content access history of a user, the content access history including one or more user actions, each user action being associated with a content item upon which the user action is performed;
- identifying one or more action trails from the content access history, each action trail including a sequence of user actions corresponding to content items relating to a topic, wherein identifying a particular action trail includes:
  - clustering the user actions into a series of segments using one or more temporal criteria;
  - splitting a segment of the series of segments into multiple segments when a topical coherence value of the segment satisfies a threshold coherence value, wherein the topical coherence value of the segment measures a similarity between content items corresponding to user actions in the segment;
  - calculating semantic similarities between the content items, wherein the semantic similarities change as a function of the series of segments; and
  - adding one or more segments of the series of segments to the action trail, when the semantic similarities between content items corresponding to the user actions in the one or more segments and content items corresponding to the user actions in another segment satisfy a similarity threshold; and
- providing the action trails for display on a display device.

26. The product of claim 25, wherein clustering the user actions into the series of segments using the temporal criteria comprises:
- identifying segmentation boundaries in the content access history, each segmentation boundary determined by an elapsed time period between two consecutive user actions, a length of the elapsed time period satisfying a boundary threshold; and
- clustering the user actions into the series of segments according to the segmentation boundaries.

27. The product of claim 25, wherein calculating semantic similarities between the content items comprises calculating cosine similarities between topic vectors of the content items, the topic vectors of the content items each including a list of topics, each topic including a semantic descriptor of one or more of the content items.

28. The product of claim 27, where calculating semantic similarities between the content items comprises calculating semantic similarities between segments, including calculating cosine similarities between the topic vectors of the respective segments, where the topic vector of each of the segments is calculated using an average of topic vectors of content items associated with user actions clustered into the segment.

29. The product of claim 25, wherein calculating semantic similarities between the content items comprises calculating calculating the semantic similarities between content items of different segments.

30. The product of claim 29, the operations comprising calculating the topical coherence value of the segment, wherein calculating the topical coherence value of the segment comprises calculating an average coherence of the segment, including averaging semantic similarities of pairs of the content items associated with the user actions clustered into the segment.

31. The product of claim 30, wherein calculating the topical coherence value of the segment comprises:
- for each first content item, determining a semantic similarity between the first content item and each second content item, the first content item and second content item associated with the user actions clustered into the segment;
- for each first content item, determining a maximum semantic similarity between the first content item and the second content items;
- calculating an average value of the maximum semantic similarities of the first content items; and
- designating the average value as a maximum coherence of the segment.

32. The product of claim 31, wherein calculating the topical coherence value of the segment comprises designating an absolute difference between the average coherence and the maximum coherence as the topical coherence value of the segment.

* * * * *

UNITED STATES PATENT AND TRADEMARK OFFICE
CERTIFICATE OF CORRECTION

| | |
|---|---|
| PATENT NO. | : 8,180,778 B1 |
| APPLICATION NO. | : 12/701444 |
| DATED | : May 15, 2012 |
| INVENTOR(S) | : Elin R. Pedersen et al. |

Page 1 of 1

It is certified that error appears in the above-identified patent and that said Letters Patent is hereby corrected as shown below:

In Claim 29, at column 22, line 22, after "comprises" delete "calculating".

Signed and Sealed this
Thirty-first Day of July, 2012

David J. Kappos
*Director of the United States Patent and Trademark Office*